United States Patent
Susnjara

[19]

[11] Patent Number: 6,059,494
[45] Date of Patent: May 9, 2000

[54] TOOL BIT MONITORING SYSTEM FOR MACHINE TOOLS

[75] Inventor: Kenneth J. Susnjara, Santa Claus, Ind.

[73] Assignee: Thermwood Corporation, Dale, Ind.

[21] Appl. No.: 08/707,863

[22] Filed: Sep. 9, 1996

[51] Int. Cl.⁷ ................................................. B23Q 17/24
[52] U.S. Cl. ............................ 409/134; 408/67; 408/11; 408/16; 409/137
[58] Field of Search .................. 408/16, 11, 67; 409/134, 137

[56] References Cited

U.S. PATENT DOCUMENTS

| | | | |
|---|---|---|---|
| Re. 31,247 | 5/1983 | Johnstone | 364/474 |
| 4,340,326 | 7/1982 | Buonauro et al. | 408/11 |
| 4,471,348 | 9/1984 | London et al. | 340/772 |
| 4,667,113 | 5/1987 | Nakajima et al. | 408/16 |
| 4,802,116 | 1/1989 | Ward et al. | 364/900 |
| 4,998,209 | 3/1991 | Vuichard et al. | 364/513 |
| 4,999,895 | 3/1991 | Hirose et al. | 409/134 |
| 5,189,625 | 2/1993 | Le Floch | 364/474.17 |
| 5,255,199 | 10/1993 | Barkman et al. | 364/474.17 |
| 5,270,627 | 12/1993 | Rehse | 318/575 |
| 5,345,390 | 9/1994 | Greenip, Jr. et al. | 364/474.17 |
| 5,391,025 | 2/1995 | Hoekstra | 409/137 |
| 5,392,122 | 2/1995 | Ulanov et al. | 356/372 |
| 5,392,502 | 2/1995 | Freer | 29/52 |
| 5,412,400 | 5/1995 | Takahara et al. | 345/119 |
| 5,439,328 | 8/1995 | Haggerty et al. | 408/16 |
| 5,522,683 | 6/1996 | Kakimoto et al. | 408/16 |
| 5,526,273 | 6/1996 | Borsari et al. | 364/474.22 |
| 5,539,869 | 7/1996 | Spoto et al. | 395/154 |
| 5,574,652 | 11/1996 | Murphy | 364/474.22 |
| 5,625,572 | 4/1997 | Yonekura et al. | 364/514 A |

FOREIGN PATENT DOCUMENTS

| | | | |
|---|---|---|---|
| 59-214505 | 12/1984 | Japan | 408/16 |
| 61-86110 | 5/1986 | Japan | 408/16 |
| 61-146407 | 7/1986 | Japan | 408/16 |
| 1-45549 | 2/1989 | Japan | 364/474.17 |

*Primary Examiner*—Daniel W. Howell
*Attorney, Agent, or Firm*—Lalos & Keegan

[57] ABSTRACT

In a machine tool having a workpiece support table and a tool head assembly provided with a tool engageable in a cutting relation with a workpiece positioned on the table for removing particulate material from the workpiece, a system for monitoring the cutting operation of the tool includes a support assembly, a camera for producing video signals representative of the cutting operation of the tool, the camera being mounted on the support assembly such that its focus is on said tool and a cut made thereby, and a machine controller coupled to the machine tool for controlling its operation. The machine controller includes a video monitor connected to the camera for receiving and displaying the video signals representative of the cutting operation of the tool while simultaneously displaying program information.

7 Claims, 2 Drawing Sheets

TOOL BIT MONITORING SYSTEM FOR MACHINE TOOLS

FIELD OF THE INVENTION

The present invention relates to machine tools such as routers and the like and more particularly to a device and system for removing material produced by the cutting action of a tool such as a router, drill, grinder or sander.

BACKGROUND OF THE INVENTION

In machine tools in which large amounts of particulate material is produced by the cutting action of a tool such as a router, drill, grinder or sander, it is required for safety and environmental reasons to remove such material from the work area. In the prior art, it typically has been the practice to remove such material by the use of a hood member mounted on the tool head assembly, encompassing the cutting tool, and a vacuum system for withdrawing the material from the interior of the hood member. Generally, such hood members have been provided with a brush disposed around the periphery of the hood member which engages the workpiece and work table to contain and accumulate the particulate material produced by the cutting tool for removal by the vacuum system. An improvement to such an arrangement is disclosed in copending patent application Ser. No. 08/274,381, now U.S. Pat. No. 5,632,579, incorporated herein by reference, in which the hood member has a lower edge that is spaced from the workpiece when the device is in its operative position, providing a peripheral air inlet opening that increases flow through the exhaust opening and enhances material removal.

A drawback to such systems, however, is that the hood member obstructs the operator's view of the tool bit and the cut made thereby. Even in instances where the hood member is constructed with clear panels, such panels tend to become covered with dust or cutting fluid and are very difficult to keep clean. In metal cutting machines, a hood may not be provided but instead the entire device may be surrounded by an enclosure. In such systems it is still advantageous to provide a facility for remote observation of the cutting operation.

SUMMARY OF THE INVENTION

The present invention overcomes certain disadvantages of the prior art devices and even the improved device of related application Ser. No. 08/274,381 by providing a system for monitoring the cutting operation of the tool bit that does not rely on direct visual observation through the hood member or inside the enclosure in metal cutting operations.

In the present invention, a video camera is mounted on or near the hood member or enclosure and focussed on the cutting bit end of the tool through an opening in the hood member or enclosure. The camera may be mounted somewhat remotely from the opening to prevent contaminates from collecting on the lens or an air flow may be directed across the camera lens to direct any contaminates away from the lens.

The camera is connected to a video monitor at the operator's control station to receive and display the video signals representative of the cutting operation. The operator can observe the quality of the cut, the feed rate or fouling of the tool bit flutes, for example, and take appropriate remedial action if necessary. It is anticipated that the present invention be used with a commercial computer numerical control (CNC) system, namely the 91000 SuperControl, available from Thermwood Corporation, Dale, Ind. In the Thermwood SuperControl, the "front end" of the machine controller is a 486-based personal computer (PC) with a 486 PC processor and PC data bus. The PC processor provides the control and communication functions for the PC compatible peripheral devices including the display for the camera-generated video image which could be displayed on command or continuously on a split screen image. The Thermwood SuperControl operates under the OS-2 operating system with full multi-tasking capabilities. Under the OS-2 multi-tasking operating system, front-end functions such as display of the video image can be performed by the PC processor independently of and concurrently with production and machine functions performed under the supervision of the controller's control processor. Thus, the operator can observe the video display of the cutting operation and simultaneously make cutting adjustments such as changing the feed rate.

BRIEF DESCRIPTION OF THE DRAWINGS

FIG. 1A is a perspective view of an alternative embodiment of the device and system of the present invention having an enclosure surrounding the computer controlled routing machine and having a camera mounted outside the enclosure.

DETAILED DESCRIPTION

In the following description the present invention is described in the environment of a wood or plastic cutting machine that is provided with a hood member for the effective evacuation of the cuttings. However, such embodiment is just an example of the application of the present invention and should not be understood as the only application. The present invention is equally applicable to other cutting machines that do not include a hood, such as a metal cutting machine that includes a large enclosure making visual observation of the cutting operation difficult.

Figure 1:
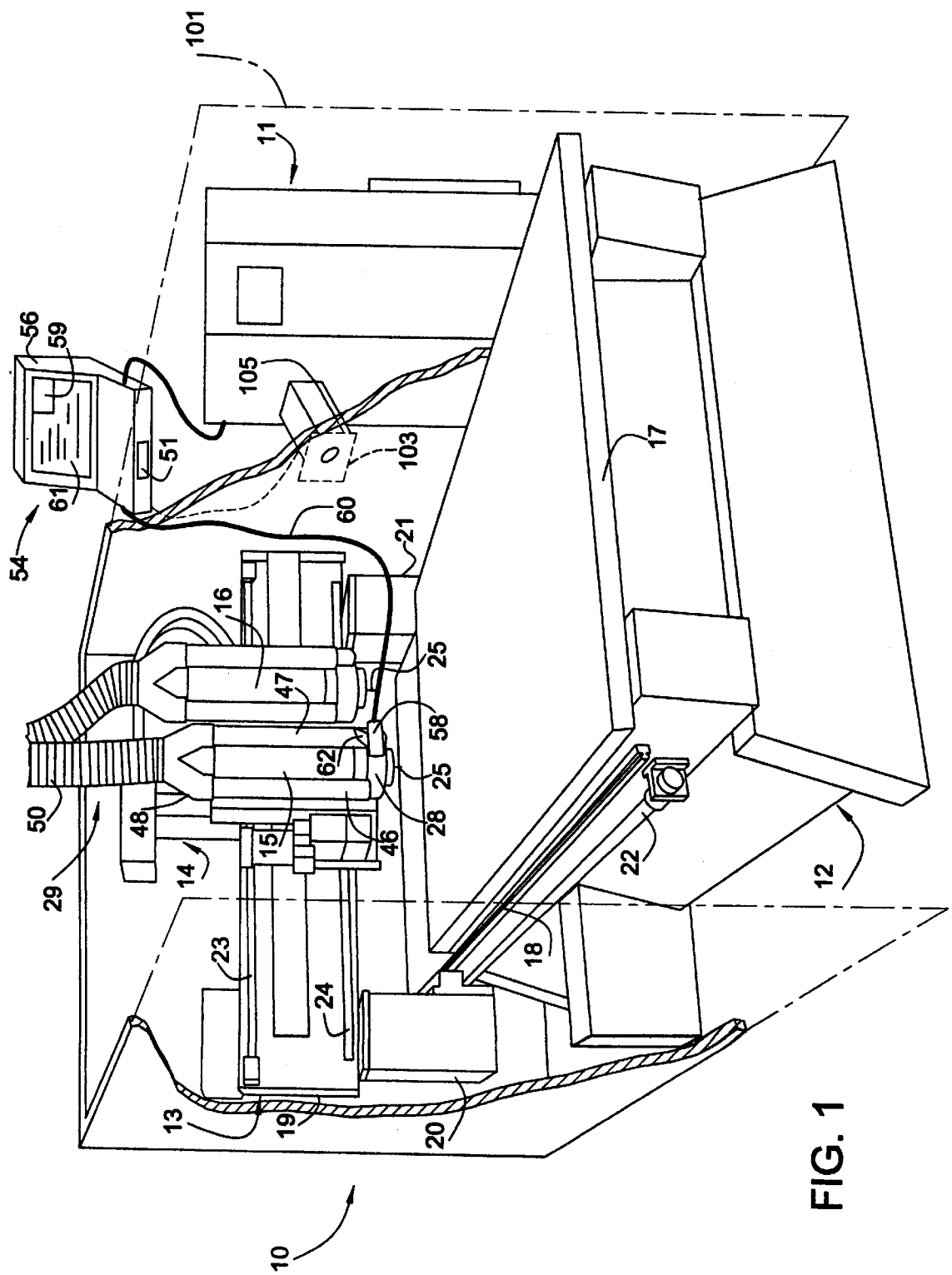
FIG. 1 is a perspective view of a computer controlled router machine equipped with a device and system for containing, removing and collecting particulate material produced by the cutting action of a router bit and for monitoring the cutting operation in accordance with the present invention.

Referring to FIG. 1, there is illustrated a router machine 10 and a machine controller 11 operatively connected to the machine for displacing a router bit of the machine along a longitudinal line of travel or an x-axis, a transverse line of travel or a y-axis and vertical line of travel or a z-axis in accordance with a program executed by the controller for performing a work function on one or more workpieces positioned on the machine. Preferably, the controller will have multi-tasking capabilities such as the 91000 SuperControl, available from the Thermwood Corporation, Dale, Ind. In the Thermwood SuperControl, the "front end" of the Machine controller is a 486-based personal computer (PC) shown generally as 54 in FIG. 1 and includes a video monitor or display 56. The PC processor provides the control and communication functions for the PC compatible peripheral devices including display 56.

Generally, the machine includes a base member 12, a bridge member 13, a tool head support assembly 14 and a pair of tool head assemblies 15 and 16. The base member is provided with a work table 17 rigidly mounted on the base member and a pair of trackways 18 mounted on the sides of the base member and disposed parallel to the x-axis of the machine. Work table 17 supports one or more workpieces to be machined. Such workpieces are positioned by positioning pins or other means and secured in position by clamps, a vacuum holddown system or any other means.

The bridge member includes a transversely disposed beam section 19 spaced above and spanning the base member, and a pair of transversely spaced, depending leg sections 20 and 21 straddling the sides of the base member and mounted on trackways 18 for displacement relative to the base member along the x-axis. The bridge member is displaced relative to the base member along the x-axis by means of a pair of drive screw assemblies 22 operatively interconnecting the side portions of the base member and inner side portions of leg sections 20 and 21.

Figure 3:
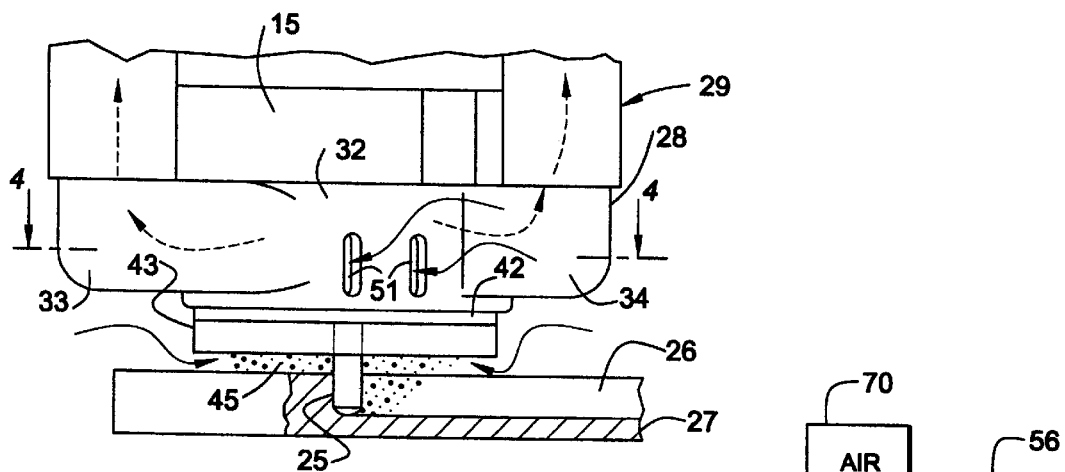
FIG. 3 is a side elevational view of the device shown in FIG. 3.

Tool head support assembly 14 is supported on and guided along a pair of transversely disposed, vertically spaced trackways 23 and 24 provided on a front face of transverse beam section 19, and is displaceable along the y-axis by a drive screw assembly operatively interconnecting the bridge member and the tool head support assembly. Each of the tool head assemblies is supported and displaceable along transversely spaced, vertically disposed trackways mounted on support assembly 14, and is adapted to be displaced by a drive screw assembly operatively interconnecting the support assembly and a tool head assembly. Each of the tool head assemblies further is provided with a router bit 25 adapted to be displaced along the x, y and z axes to provide a cutting pattern 26 in a workpiece 27 supported on the work table, as shown in FIG. 3, to produce particulate material consisting of wood, plastic or non-ferrous metallic particles which become airborne due to the high speed rotary motion of the router bit. As further shown in FIG. 1, a video camera 58 is connected by a video cable 60 to video display 56 to monitor the bit 25 and cutting pattern 26 during a cutting operation, and is mounted on at least one of the tool head assemblies, e.g. assembly 15, by brackets 62 or any other suitable device. With the camera 58 mounted on the tool head assembly it will move in the x, y and z directions commensurate with the movement of the tool bit. An identical camera can be mounted on the tool head assembly 16 to monitor the cutting operation of its associated cutting bit.

The airborne particulate material produced by the cutting action of the router bit is contained and removed by a particulate removal system consisting of a hood device 28, a pneumatic conveying assembly 29, a filter collector and a vacuum pump.

Figure 2:
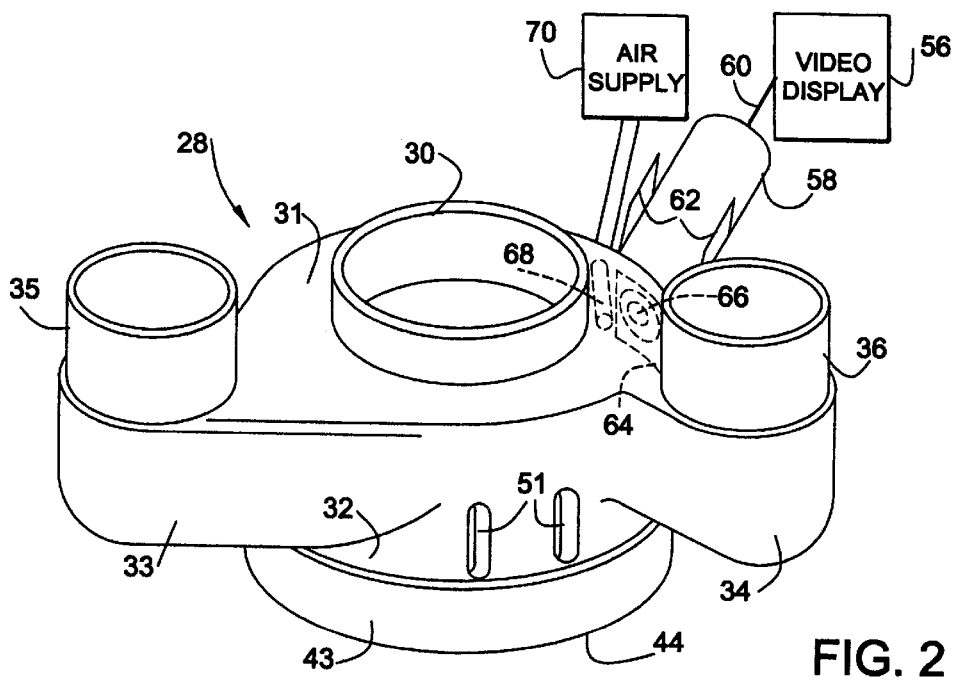
FIG. 2 is an enlarged, perspective view of the device shown in FIG. 1.
Figure 4:
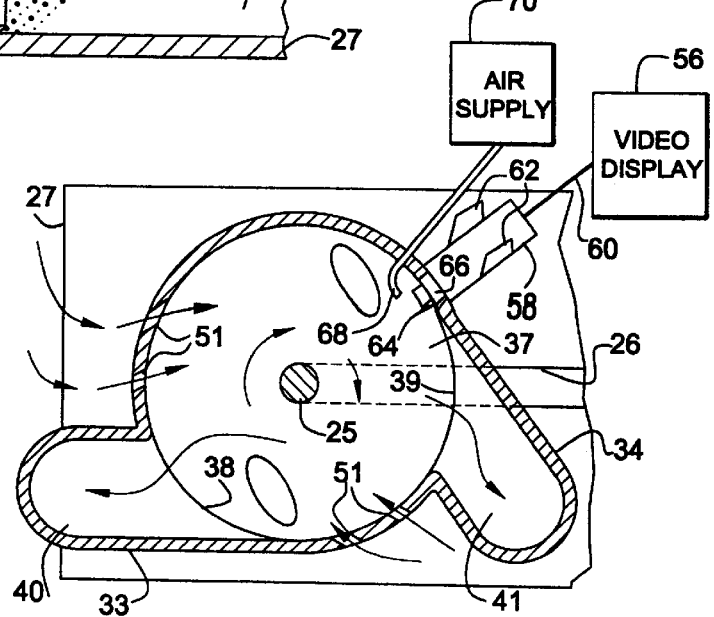
FIG. 4 is a cross-sectional view taken along line 4—4 in FIG. 3.

As best shown in FIGS. 2 through 4, hood device 28 includes an upper, annular mounting flange section 30 mountable on the lower end of a tool head assembly, coaxially with router bit 25, an annular upper wall section 31 and an annular side wall section 32 also disposed coaxially relative to the router bit when the device is mounted on the tool head assembly in depending relation. The side wall section of the device is provided with a pair of tangentially disposed portions 33 and 34 curving upwardly and terminating in a pair of upwardly opening tubular conduit portions 35 and 36 disposed substantially parallel to the axis of side wall section 32. When mounted in an operative position on the lower end of a tool head assembly, such structure provides a cylindrical chamber 37 communicating through a pair of outlet openings 38 and 39 and tangentially disposed passageways 40 and 41 with tubular conduit portions 35 and 36. The transition portions of upper wall section 31, side wall section 32 and tangentially disposed portions 33 and 34 are smoothly rounded to facilitate the flow of air through the device.

As shown in FIG. 2, with a portion of the upper wall section 31 broken away, a video camera 58 is mounted to the tool head assembly 15 or 16 (FIG. 1) by brackets 62 or other suitable devices proximate to side wall section 32 of the hood device 28 in line of sight with tool bit 25. Side wall section 32 is provided with an opening 64 through which a lens 66 of camera 58 is focussed on the tool bit 25 and cut 26. The lens 62 may be placed outside of the opening 64, as shown in FIG. 2, to reduce the chance of particulate material forming on the lens, or lens 66 may extend through opening 64, as shown in FIG. 4, and be provided with an air purging apparatus such as air hose 68 that directs a stream of air across the lens to direct any contaminates away from the lens. Hose 68 will be connected to a suitable supply 70. In machines that do not include a hood member but instead are surrounded by an enclosure, as best shown in FIG. 1A, the camera is mounted inside the enclosure such as on the tool head support assembly or may be positioned outside the enclosure but in line of sight with the tool bit and focussed through an appropriate opening in the enclosure on the tool bit and cut.

Mounted on a depending, annular lip portion 42 of side wall section 32 is an annular skirt member 43 preferably formed of a clear, semi-flexible plastic material, having a lower annular edge 44 adapted to be positioned in spaced relation to the upper surface of the workpiece when in the operative position, to provide an annular, primary air inlet opening 45. Though skirt member 43 is preferably clear, it may become dirtied with particulate materials and cutting fluid and can be difficult to clean. However, with the monitoring system of the present invention, the cutting operation can continue to be viewed by the operator at his remote video display 56.

As best shown in FIG. 1, the pneumatic conveying assembly 29 includes a pair of tubular conduits 46 and 47 mounted on the tool head assembly and communicating at their lower ends with tubular conduit portions 35 and 36, a merging section 48 supported on and communicating with tubular conduits 46 and 47 and a flexible conduit 50 communicating merging section 49 with an inlet of a filter collector on the upstream side of the vacuum pump.

In the operation of the particulate material containment and removal device and system as described, the vacuum pump is first started to draw air through the lower opening of device 28 provided by annular skirt 43, chamber 37, tangential passageways 40 and 41, tubular portions 35 and 36 and conduits 46, 47, 48 and 50 to the filter collector. When command signals are then transmitted from the controller to the drive motors of the machine, a tool head assembly and associated router bit will be positioned and advanced as shown in FIG. 3 with lower edge 44 of the skirt member being spaced from the upper surface of workpiece 27 to provide primary air inlet opening 45, and the router bit cutting a pattern 26 in the workpiece. As the router bit spins at a high speed and cuts through the workpiece, the particulate material produced by the cutting action will become airborne and caused to be entrained in air drawn through primary air inlet opening 45. The air flow with the entrained particulate material will flow upwardly in chamber 37 with a swirling motion and be caused to flow outwardly through tangential passageways 40 and 41 and through the conduit assembly to the filter collector. The entrainment, containment and motion of the particulate material produced by the cutting action of the tool bit is caused by a combination of the spinning motion of the tool bit which causes the particles of the cut material to become airborne and entrained in a whirling airstream and the induction of air drawn radially inwardly through primary annular inlet opening 45 which functions to enhance the entrainment of the particles and further cause them to be contained within the upwardly swirling air stream.

During such cutting operation, the video camera 58 is operated under control of PC 54 to monitor the tool bit 25 and cut 26. The video signal is transmitted via video cable 60 to video monitor 56 for display under control of video interface card 57. Video cable 60 may also contain control and status signal lines between the camera and the PC. The video interface card 57 may be any commercially available device, usually inserted into a backplane slot of the PC, that permits split screen display of a video image on a monitor screen while permitting simultaneous display of program information. For example, the video display of the tool operation can be displayed in a small portion or window 59 of the display screen while the balance of the screen 61 remains dedicated to displaying program information. The camera may be any conventional type but will be preferably small, such as 2 inch×2 inch and can be mounted on any part of the tool head support assembly, on or through the hood member or on or through an enclosure surrounding the machine as long as it is in line of sight with the tool bit 25 and can be focussed on the tool bit 25 and cut 26. The operator can thereby monitor the quality of the cut, proper feed rate, tool wear and cuttings fouled in the tool bit flutes, or example. In the Thermwood SuperControl 91000, with its multi-tasking capabilities, the operator can on-line change the cutting operation, e.g. change the feed rate, in accordance with his observations. The Thermwood SuperControl operates under the OS-2 operating system, which is widely known and well understood in the art and a detailed discussion is not required for an understanding and appreciation of the present invention.

As best shown in FIGS. 2 through 4, wall section 32 is provided with a plurality of air inlet openings 51 through which secondary air is drawn and caused to swirl thus accelerating the flow of primary air drawn through annular opening 45 with the entrained particulate material, and further functioning to contain the air flow and maintain the entrainment of the material to assist in its removal. For ideal operating conditions, the area of air inlet opening 45 is substantially equal to the area of outlet openings 38 and 39. The opening of hose 68 is directed at or in front of lens 66 to direct any particulate material flowing in the hood member away from the lens to prevent it from being contaminated.

Hood device 28 may be formed of any suitable material and fabricated by any conventional method. Preferably, the device is of a one-piece molded plastic construction. The skirt member may be formed of any plastic material and preferably of a clear plastic material to allow viewing of the router tool and the cut produced by the cutting action of the tool when the camera is not in use or in addition to the camera image. The components of the pneumatic conduit assembly also may be formed of any suitable plastic materials. Preferably, the entire particle removal system will be formed of lightweight materials since they are supported on the tool head assembly.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

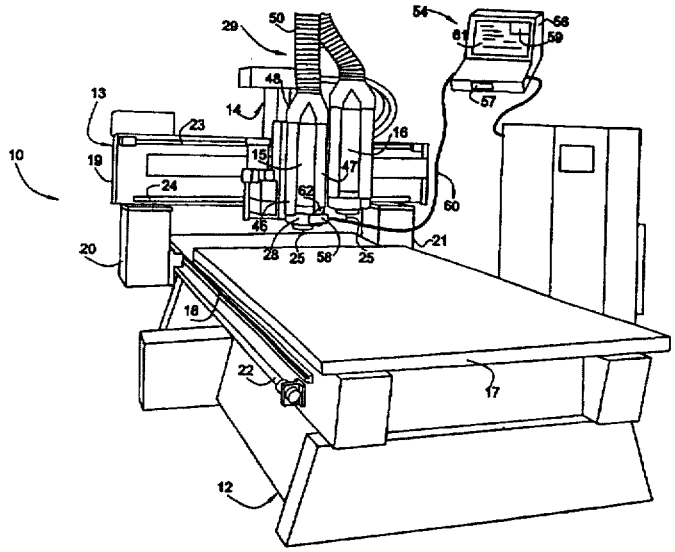

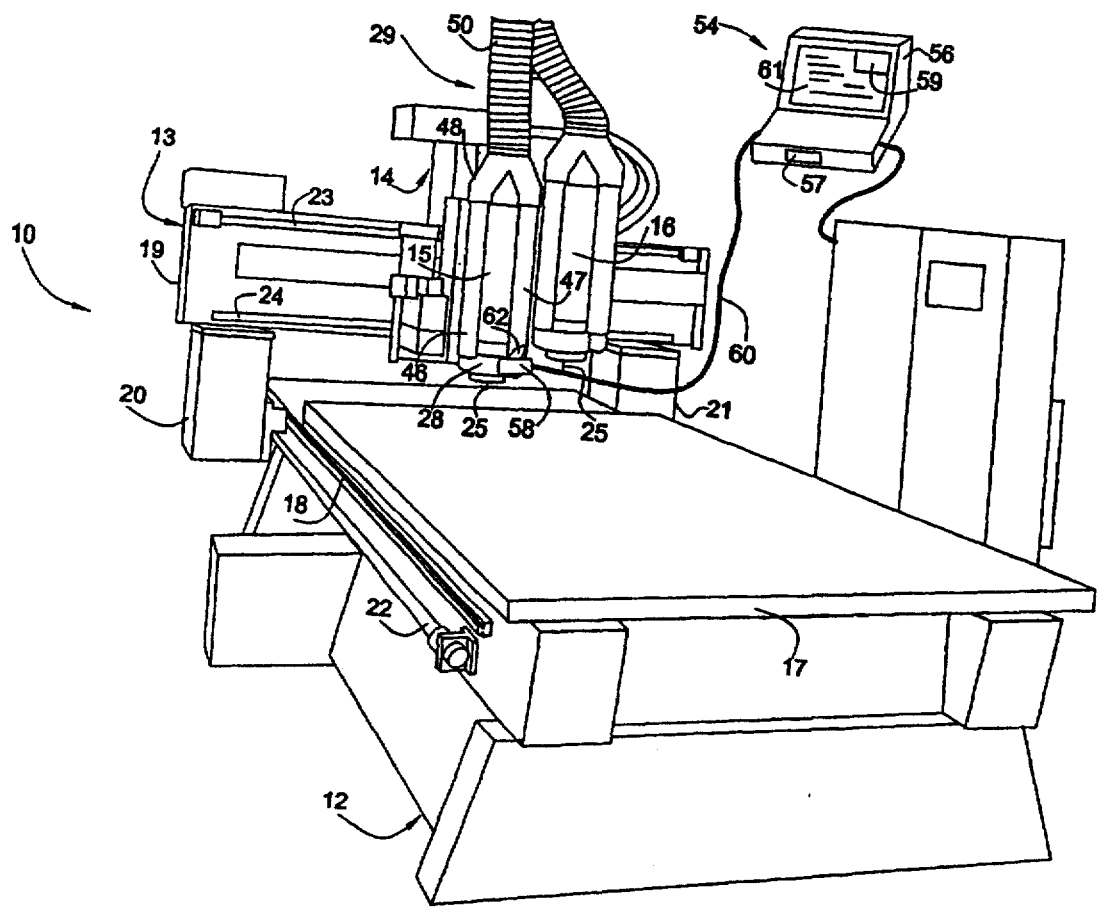

I claim:

1. In a machine tool having a workpiece support table and a tool head assembly provided with a tool engageable in a cutting relation with a workpiece positioned on said table for removing particulate material from said workpiece, a system for monitoring the cutting operation of the tool, comprising:

a support assembly;

a camera for producing video signals representative of the cutting operation of the tool, said camera being mounted on said support assembly such that its focus is on said tool and a cut made thereby;

a machine controller coupled to said machine tool for controlling its operation;

said machine controller including a video monitor connected to said camera for receiving and displaying said video signals representative of said cutting operation of said tool;

said machine controller further including a video interface connected to said video monitor for enabling display of said video signals representative of said cutting operation of said tool in a first portion of a display screen of said video monitor and simultaneous display of program information in a second portion of said display screen.

2. A system as in claim 1 wherein said support assembly is displaceable relative to said workpiece support table such that said camera is maintained in line of sight with said tool.

3. A system as in claim 1 wherein said support assembly supports said tool.

4. A system as in claim 1 further including an air supply and an air hose connected to said air supply and mounted proximate to said camera for directing air past a lens of said camera to direct air-borne contaminates away from said lens.

5. A system as in claim 1 further including a hood member mountable on said tool head assembly about said tool, said hood including an opening therethrough and wherein said camera is mounted on said support assembly such that said camera is in line of sight with said tool through said opening.

6. A system as in claim 1 further including an enclosure for surrounding said machine tool, said enclosure including an opening therethrough and wherein said camera is mounted on said support assembly such that said camera is in line of sight with said tool through said opening.

7. A system as in claim 1, wherein said machine controller includes a multi-tasking operating system to permit an operator to observe said cutting operation on said video monitor while the machine controller concurrently performing machine operations.

* * * * *

UNITED STATES PATENT AND TRADEMARK OFFICE
CERTIFICATE OF CORRECTION

PATENT NO.   : 6,059,494
DATED        : May 9, 2000
INVENTOR(S)  : Kenneth J. Susnjara It is certified that error appears in the above-identified patent and that said Letters Patent is hereby corrected as shown below:

Title page should be deleted to appear as per attached title page.

The sheet of drawing, consisting of figure 1 should be deleted as per attached figure.-

Signed and Sealed this

Fourth Day of December, 2001

*Attest:*

*Nicholas P. Godici*

*Attesting Officer*

NICHOLAS P. GODICI
*Acting Director of the United States Patent and Trademark Office*

United States Patent [19]

Susnjara

[11] Patent Number: 6,059,494
[45] Date of Patent: May 9, 2000

[54] TOOL BIT MONITORING SYSTEM FOR MACHINE TOOLS

[75] Inventor: Kenneth J. Susnjara, Santa Claus, Ind.

[73] Assignee: Thermwood Corporation, Dale, Ind.

[21] Appl. No.: 08/707,863

[22] Filed: Sep. 9, 1996

[51] Int. Cl.$^7$ .................................................... B23Q 17/24
[52] U.S. Cl. ............................ 409/134; 408/67; 408/11; 408/16; 409/137
[58] Field of Search ............................ 408/16, 11, 67; 409/134, 137

[56] References Cited

U.S. PATENT DOCUMENTS

| | | | |
|---|---|---|---|
| Re. 31,247 | 5/1983 | Johnstone | 364/474 |
| 4,340,326 | 7/1982 | Buonauro et al. | 408/11 |
| 4,471,348 | 9/1984 | London et al. | 340/772 |
| 4,667,113 | 5/1987 | Nakajima et al. | 408/16 |
| 4,802,116 | 1/1989 | Ward et al. | 364/900 |
| 4,998,209 | 3/1991 | Vuichard et al. | 364/513 |
| 4,999,895 | 3/1991 | Hirose et al. | 409/134 |
| 5,189,625 | 2/1993 | Le Floch | 364/474.17 |
| 5,255,199 | 10/1993 | Barkman et al. | 364/474.17 |
| 5,270,627 | 12/1993 | Rehse | 318/575 |
| 5,345,390 | 9/1994 | Greenip, Jr. et al. | 364/474.17 |
| 5,391,025 | 2/1995 | Hoekstra | 409/137 |
| 5,392,122 | 2/1995 | Ulanov et al. | 356/372 |
| 5,392,502 | 2/1995 | Freer | 29/52 |
| 5,412,400 | 5/1995 | Takahara et al. | 345/119 |
| 5,439,328 | 8/1995 | Haggerty et al. | 408/16 |
| 5,522,683 | 6/1996 | Kakimoto et al. | 408/16 |
| 5,526,273 | 6/1996 | Borsari et al. | 364/474.22 |
| 5,539,869 | 7/1996 | Spoto et al. | 395/154 |
| 5,574,652 | 11/1996 | Murphy | 364/474.22 |
| 5,625,572 | 4/1997 | Yonekura et al. | 364/514 A |

FOREIGN PATENT DOCUMENTS

| | | | |
|---|---|---|---|
| 59-214505 | 12/1984 | Japan | 408/16 |
| 61-86110 | 5/1986 | Japan | 408/16 |
| 61-146407 | 7/1986 | Japan | 408/16 |
| 1-45549 | 2/1989 | Japan | 364/474.17 |

*Primary Examiner*—Daniel W. Howell
*Attorney, Agent, or Firm*—Lalos & Keegan

[57] ABSTRACT

In a machine tool having a workpiece support table and a tool head assembly provided with a tool engageable in a cutting relation with a workpiece positioned on the table for removing particulate material from the workpiece, a system for monitoring the cutting operation of the tool includes a support assembly, a camera for producing video signals representative of the cutting operation of the tool, the camera being mounted on the support assembly such that its focus is on said tool and a cut made thereby, and a machine controller coupled to the machine tool for controlling its operation. The machine controller includes a video monitor connected to the camera for receiving and displaying the video signals representative of the cutting operation of the tool while simultaneously displaying program information.

7 Claims, 2 Drawing Sheets